Dec. 2, 1952　　　　　L. L. YOUNG ET AL　　　　　2,619,707
AUTOMATIC INDEXING DRILL PRESS
AND FLAME CUTTING MACHINE
Filed Jan. 27, 1950　　　　　　　　　　　　　　　11 Sheets-Sheet 6

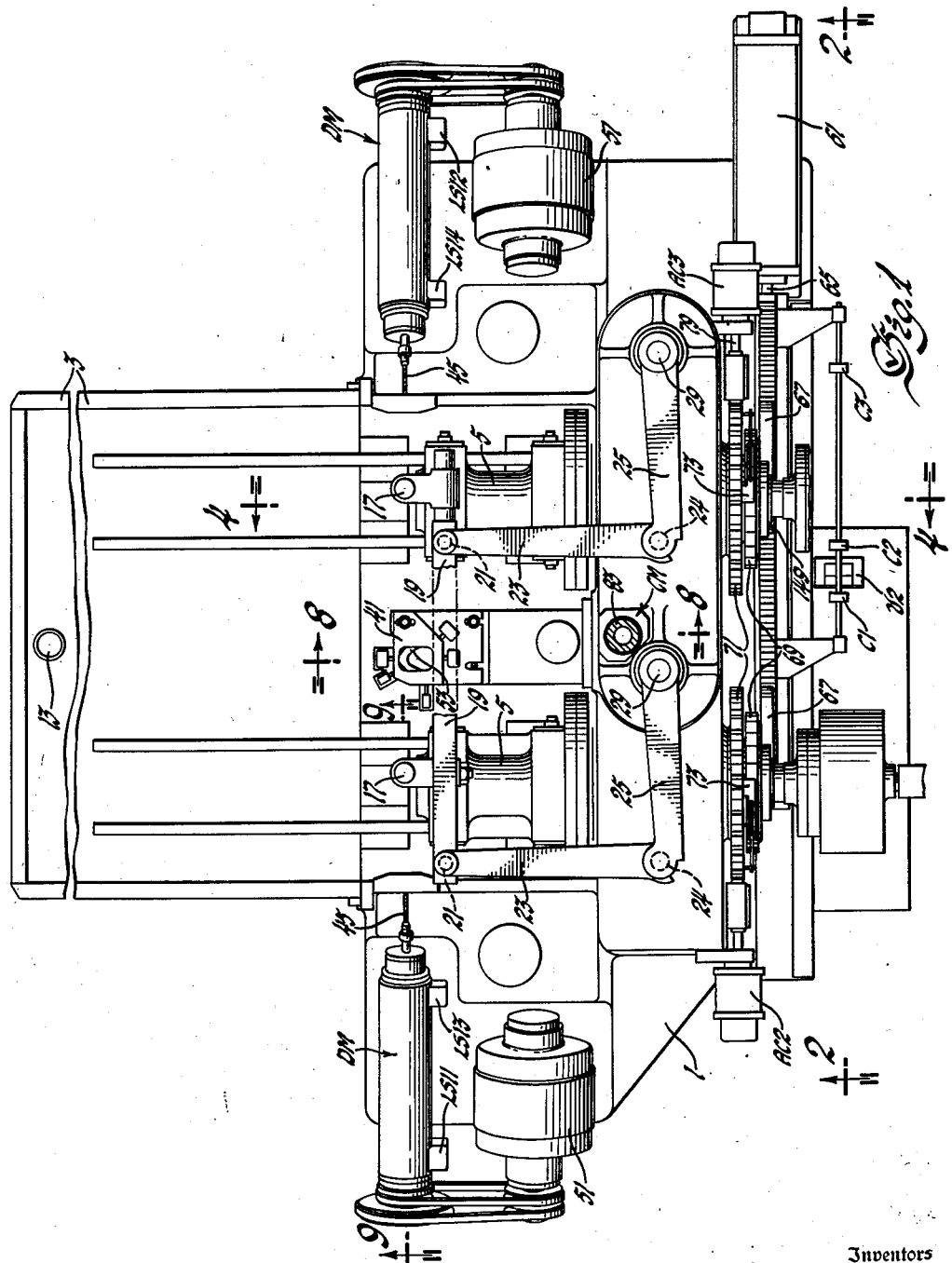

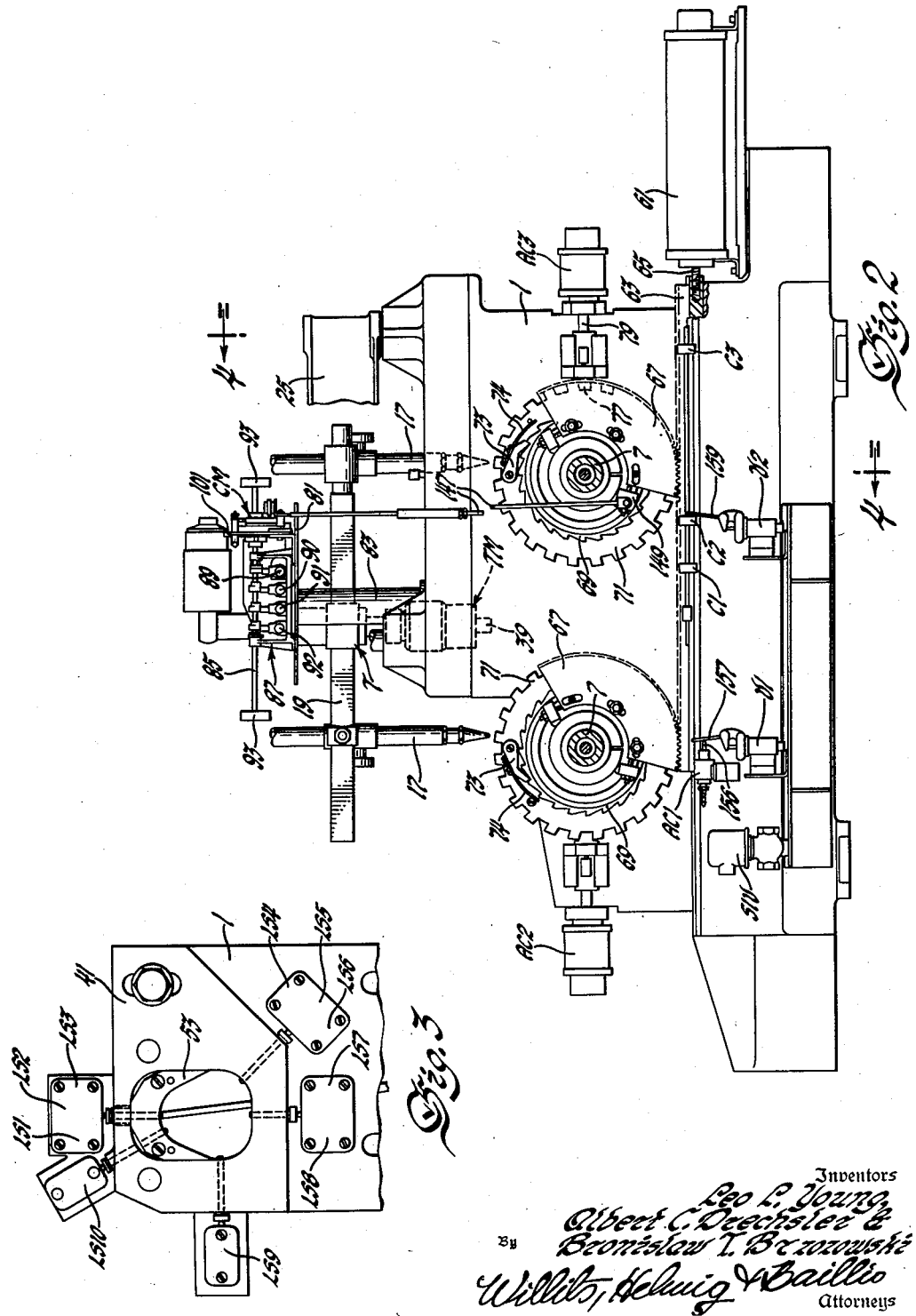

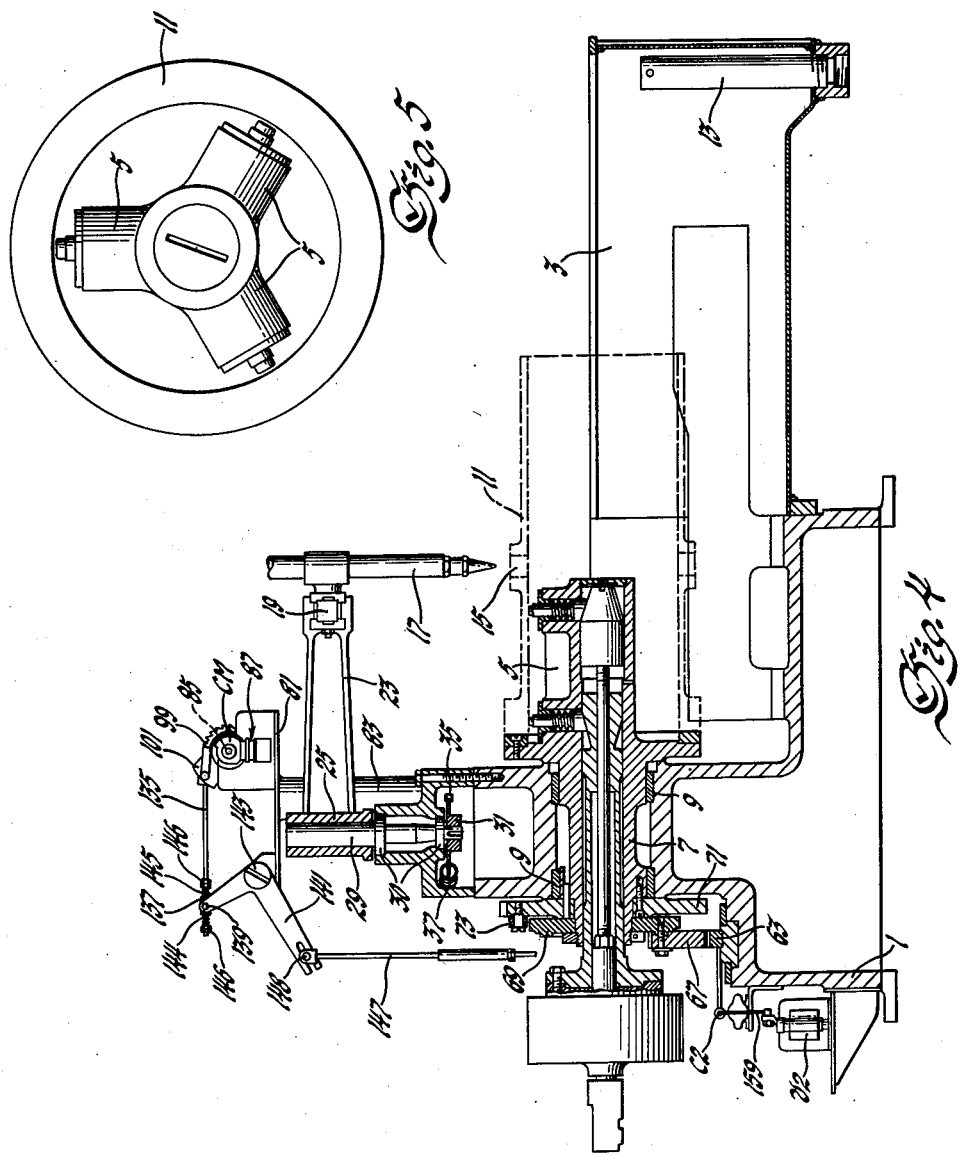

Inventors
Leo L. Young,
Albert C. Drechsler &
Bronislaw T. Brzozowski
By Willits, Helwig & Baillie
Attorneys Dec. 2, 1952

L. L. YOUNG ET AL
AUTOMATIC INDEXING DRILL PRESS
AND FLAME CUTTING MACHINE 2,619,707

Filed Jan. 27, 1950

Inventors
Leo L. Young,
Albert C. Drechsler &
Bronislaw T. Brzozowski

By Willits, Helwig & Baillio
Attorneys

Patented Dec. 2, 1952

2,619,707

UNITED STATES PATENT OFFICE 2,619,707

AUTOMATIC INDEXING DRILL PRESS AND FLAME CUTTING MACHINE

Leo L. Young, Albert C. Drechsler, and Bronislaw T. Brzozowski, Cleveland, Ohio, assignors to General Motors Corporation, Detroit, Mich., a corporation of Delaware Application January 27, 1950, Serial No. 140,918

12 Claims. (Cl. 29—26)

This invention generally relates to flame cutting machines in which the cutting of metals is accomplished by torches and more particularly to automatic flame cutting machines for cutting a plurality of ports in engine cylinder liners.

The principal object of the invention is to provide a machine including work supporting, indexing, drilling and cutting torch controlling and guiding mechanisms to provide accurately formed ports in engine cylinder liners and automatic control means for controlling combined and sequential operation of these mechanisms to relieve the machine operator of all operations except loading the unfinished workpieces and removing the finished pieces.

The combined mechanisms and automatic control means included in the machine by which this object is accomplished and novel features thereof are clearly illustrated in the appended drawings and described in detail in the following specification.

Figure 1 of the drawings is a plan view of the machine.

Figure 2 is an end elevation view.

Figure 3 is an enlarged plan view of a detail shown in Figure 1.

Figure 4 is a vertical cross sectional view taken on lines 4—4 of Figures 1 and 2.

Figure 5 is an enlarged end elevation view of a detail of Figure 6.

Figure 6:
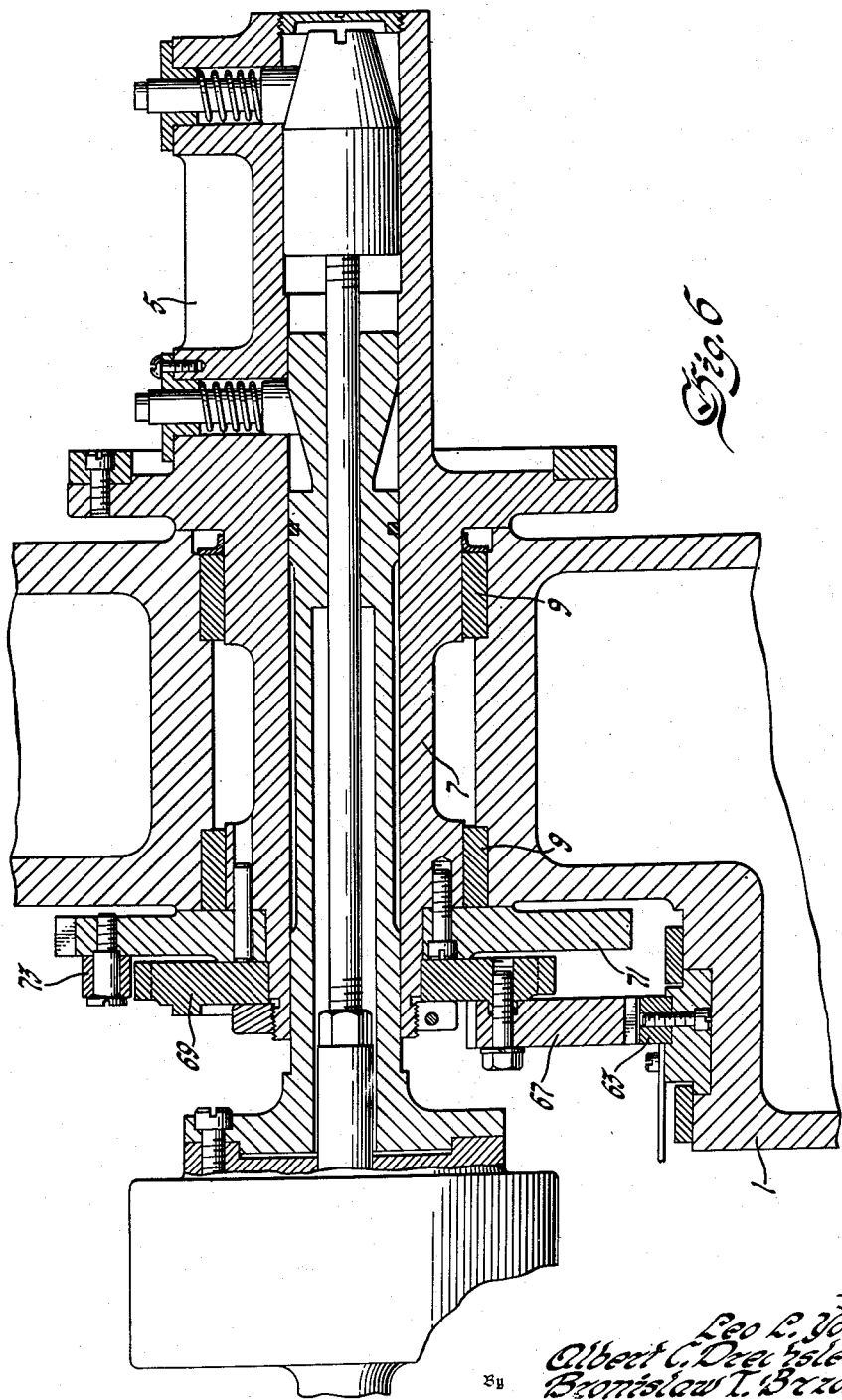
Figure 6 is an enlarged sectional view of a portion of Figure 4 with parts shown broken away and in section.

As best seen in Figures 1, 2, 4 and 6, the machine comprises a frame 1 having a tank portion 3 at one end and a pair of pneumatic three jaw internal chucks 5 supported on horizontal hollow spindles 7 rotatably supported in parallel relation in bearings 9 in the frame 1. The two chucks 5 support in horizontal centered relation, separate workpieces, which in this case are forged steel engine cylinder liners 11 shown in dotted lines in Figure 4 within the tank portion 3 of the machine frame. Water or other suitable coolant is circulated and maintained in the tank 3, level with the top of an overflow pipe 13 therein, shown best in Figure 4, so that the lower portion of each cylinder liner 11 is submerged, both for cooling and to intercept molten metal from the ports 15 being flame cut in the upper portion of the liners 11 to prevent this molten metal from falling directly on and adhering to the lower portion of the liners.

A pair of cutting torches 17 are secured adjacent each end of a supporting bar 19 which is pivotally supported at the ends by vertical pins 21 on separate links 23, extending parallel to the axis of the chucks 5. The opposite ends of each of the links 23 are pivotally supported by vertical pivot pins 24 on the outer ends of separate aligned support levers 25 extending in the same direction transversely with respect to the links 23. The inner end of each of the levers 25 is secured to a vertical pivot shaft 29, as best illustrated in Figure 4. Each of the shafts 29 is supported in bearings 30 in the frame 1 at transversely spaced points for rotation about a vertical axis. The lower end of each shaft 29 has a sprocket 31 secured thereto and a chain 35 connects the sprockets 31 and includes a tension spring 37 so that the shafts 29 are caused to rotate together through the same angle in either direction. A conventional motor driven magnetic tracer mechanism, indicated generally by the character reference T is secured on the torch supporting bar 19 intermediate the torches 17 as best seen in Figure 2. An electromagnetic roller 39 of the tracer mechanism T extends downwardly therefrom for rotation about a vertical axis, within a rounded corner rectangular opening in steel template plate 41 adjustably secured to the frame 1 as best seen in Figures 1, 2, 3, 4 and 16 so that the electromagnetic roller 39 is held by magnetic attraction in frictional driving relation with the inner periphery of the rectangular template opening and when rotated by an electric tracer drive motor TM traces a rectangular path therein, thereby causing the torches to be moved in a corresponding path directly above and slightly displaced on the same side of each of the axes of the chucks 5 supporting the liners 11 in order that rectangular ports extending tangentially to each liner axis are simultaneously cut by the torches 17.

Figure 9:
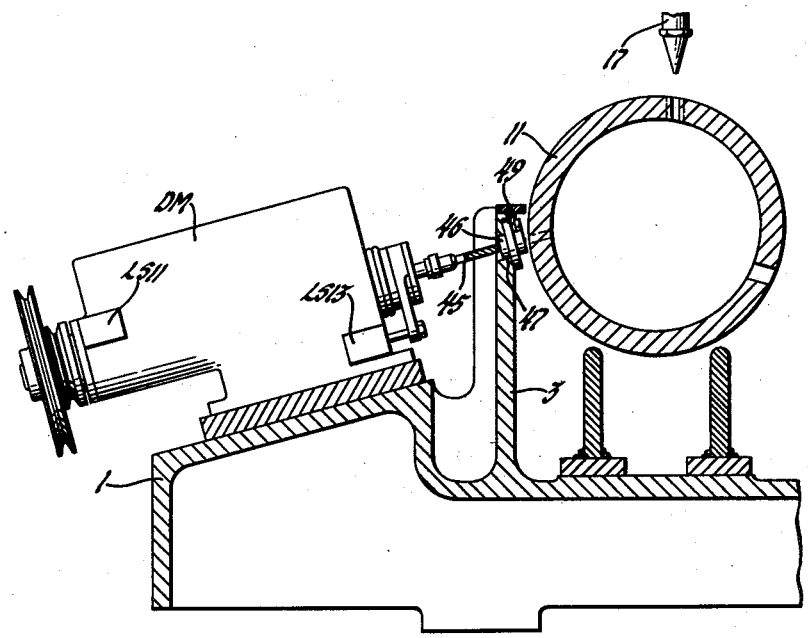
Figure 9 is an enlarged sectional view taken on lines 9—9 of Figure 1 with parts shown broken away and in section.
Figure 10:
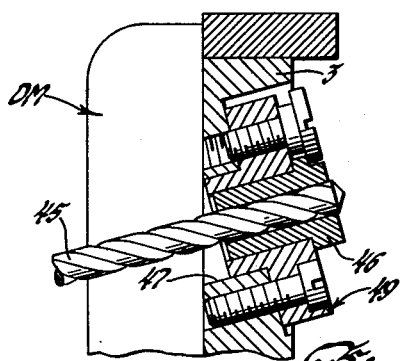
Figure 10 is an enlarged view of details shown in Figure 9 with parts shown broken away and in section.

Two automatic drilling mechanisms generally indicated by the character reference DM are secured on opposite sides of the frame tank portion 3 as best shown in Figure 9. Each of these mechanisms are of a well known type and include two-way pneumatic feed and retracting mechanisms for a drill 45, as shown in Figure 10 extending through a bushing 46 secured in an opening 47 inclined transversely, inwardly and upwardly in each side wall of the tank 3. The bushing 46 is secured in the opening 47 by a clamping mechanism generally indicated at 49 to drill a hole tangentially through each of the liners at a point angularly displaced from each torch 17 so that upon the next indexing operation of the liners the torches 17 will be directed axially with respect to the drilled holes for the start of the port flame cutting operation. An electric motor 51 is shown in Figure 1 connected by pulleys and belts to each drilling mechanism DM to rotate the drill 45. The operation of the pneumatic drill feeding and retracting mechanism which causes alternate feed and chip retracting movement of the drill until the drilling operation is completed will be described subsequently.

Figure 8:
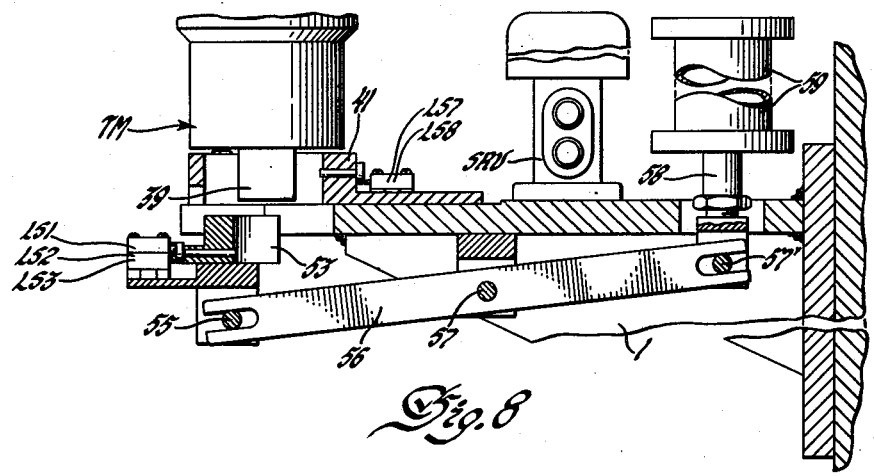
Figure 8 is an enlarged sectional view taken on lines 8—8 of Figure 1 with parts shown broken away and in section.

In that it is first necessary to drill a hole in each liner and then index both liners so that these holes are aligned beneath the torches for the initial port cutting operation thereon, a V-shaped ramp 53, is best shown in Figures 1, 3, 8 and 16 normally positioned within one end of the opening in the template plate 41 to modify the path of movement of the magnetic tracer roller 39 therein during the initial drilling of the liners 11. The ramp 53, as best illustrated in Figure 8, is slidably mounted for vertical movement in the frame 1 into and out of the lower end of the template opening and is pivotally connected by a pin 55 to one end of a rocking lever 56 pivoted at 57 on the frame 1 intermediate the ends. The opposite end of the lever 56 is pivotally connected at 57' to a double acting plunger 58 in a pneumatic cylinder 59 for elevating and depressing the ramp in and out of the template plate opening. A four-way electropneumatic reversing valve SRV is provided for controlling reverse movement of the plunger 58.

Figure 7:
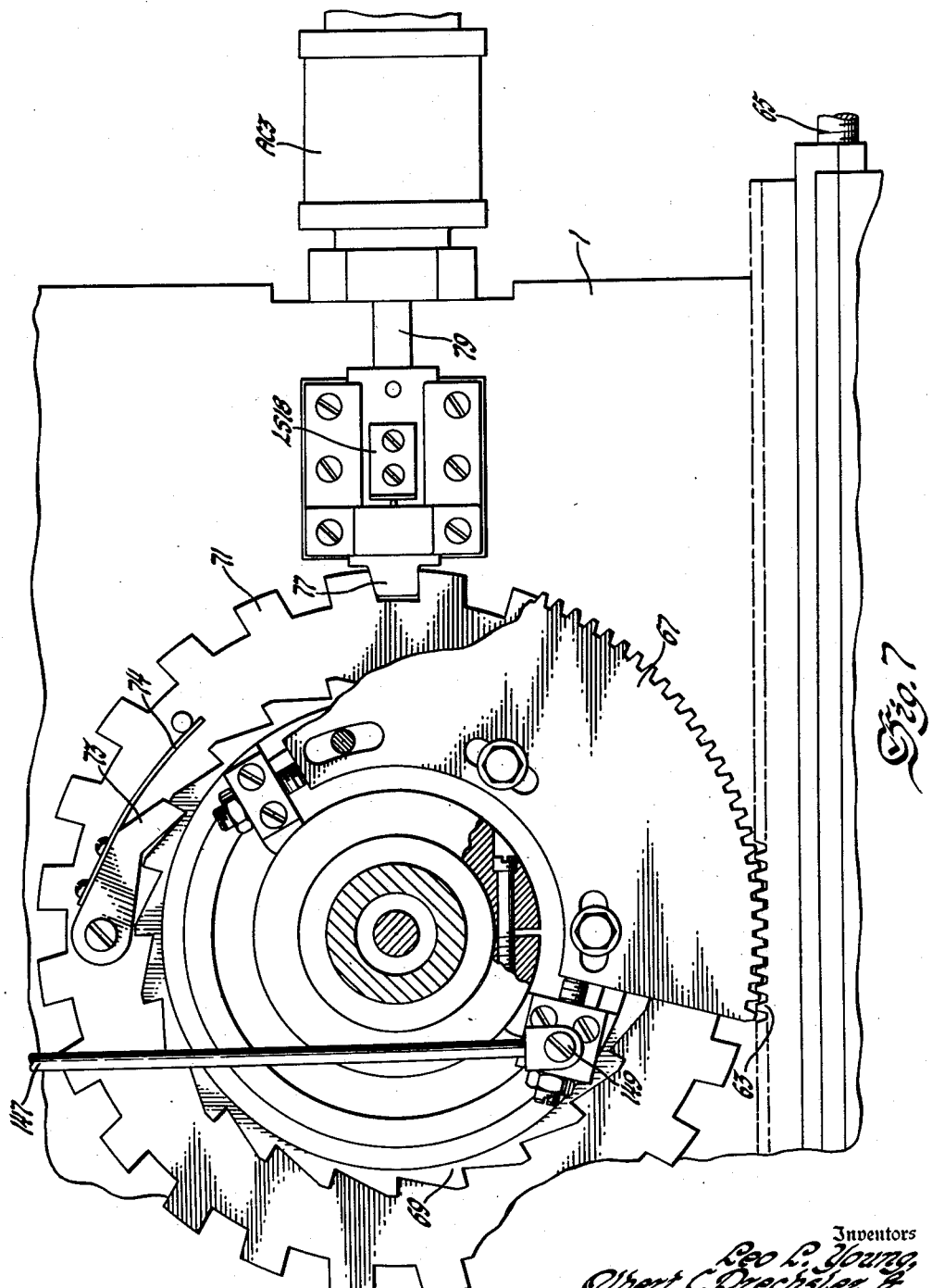
Figure 7 is an enlarged end elevation view of a portion of Figure 2 with parts shown broken away and in sections.
Figure 16:
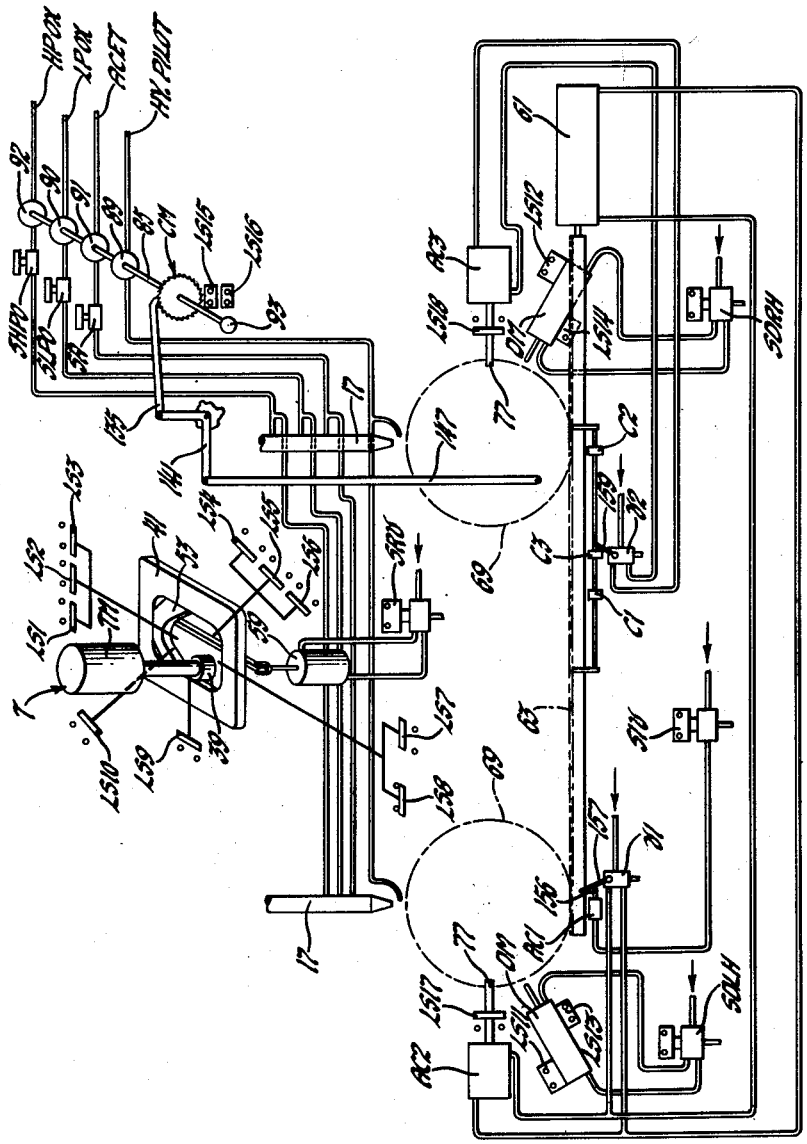
Figure 16 is a schematic view of the mechanisms of the preceding figures, piping therebetween and certain electrical control devices therefor.

Indexing of the liners 11 is accomplished by the following indexing mechanism. An indexing power cylinder 61, best shown in Figures 1, 2 and 16, is secured transversely on one end of the frame 1 and includes a double-acting piston therein having a rack 63 formed in the outwardly extending end of the piston rod 65. The rack 63 is guided in ways in the frame 1 and meshes with a pair of gear segments 67, each adjustably secured to a ratchet wheel 69 rotatable on each of the chuck spindles 7 adjacent an index plate 71 thereon having peripheral indexing notches and a pawl 73 pivoted thereon and urged by a spring 74 into contact with the adjacent ratchet, as best shown in Figures 6 and 7. It will be noted that the index plates 71 and ratchets 69 and pawls 73 are arranged on each of the spindles 7 so that upon outward movement of the rack 63 from the cylinder 61, clockwise angular movement is imparted to the right chuck spindle, as shown in Figure 2, through an angle of 105 degrees and upon inward movement of the rack counterclockwise angular movement through the same angle is imparted to the left-hand chuck spindle. The indexing plates are provided with twenty-four indexing notches and each indexing plate is indexed to each of twenty-four positions and retained in each of these positions by means of a detent 77 formed on the piston rod 79 of separate double acting pistons not shown, each piston being made movable in one of two cylinders AC2 and AC3 mounted on the frame 1 adjacent each indexing plate 71. Separate switches LS17 and LS18 are secured to the frame 1 and each is moved to the closed position only upon entry of each detent 77 into a notch of an indexing plate 71.

Figure 11:
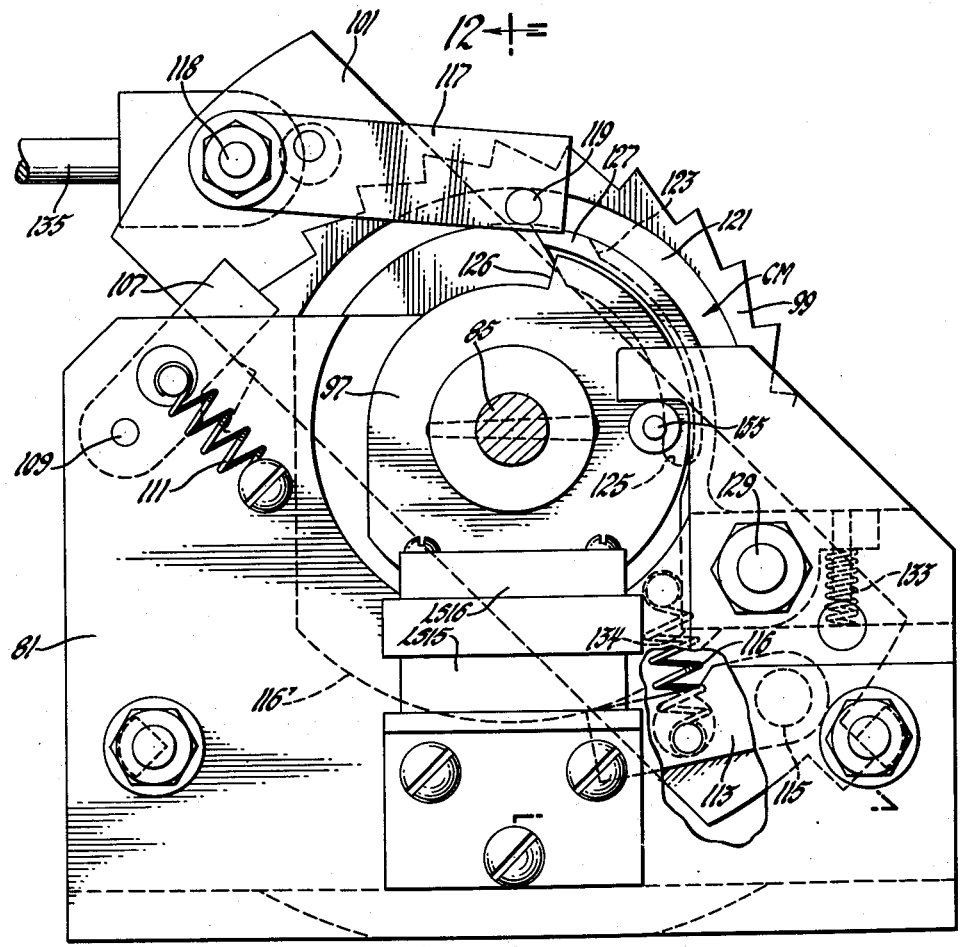
Figure 11 is an enlarged side elevation view of certain details of Figure 4.
Figure 12:
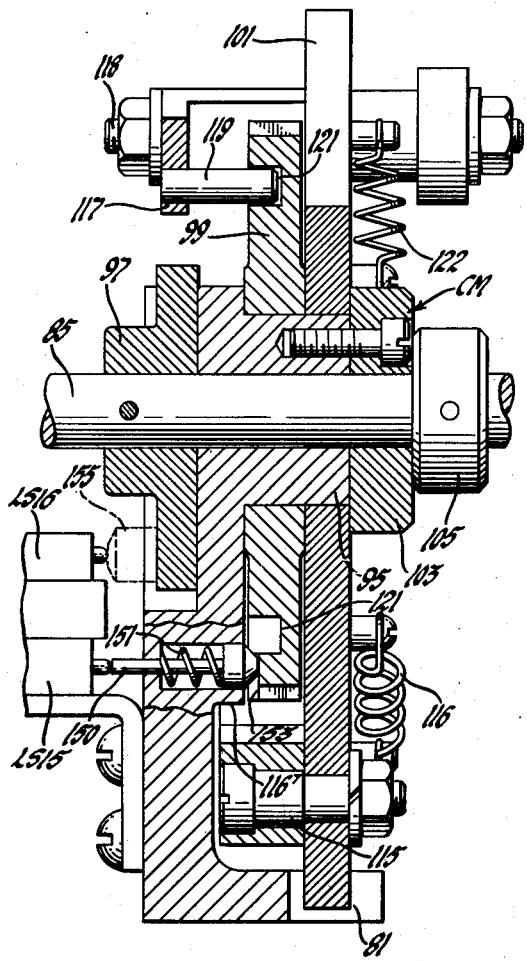
Figure 12 is an enlarged cross-sectional end elevation view taken on line 12—12 of Figure 11.

In order to automatically shut down the machine, when all of the ports in the two liners have been flame cut, an index counting and shut down mechanism, generally indicated by the character reference CM in Figures 2, 4, 11, 12, 13, 14, 15 and 16, is provided. This mechanism as best illustrated in Figures 2, 4, 11 and 12 comprises a bracket 81 secured to an upstanding portion 83 of the frame 1 in transverse alignment with the camshaft 85 of a conventional gas valve mechanism, generally indicated at 87, also secured to the frame portion 83 and including a hydrogen pilot valve 89, a low pressure oxygen valve 90, an acetylene valve 91, and a high pressure cutting oxygen valve 92. Each of these valves is opened by a separate cam shown on the camshaft upon manual rotation of either handle 93 on the ends of the camshaft 85. One end of the camshaft 85 is rotatably mounted in a hub portion 95 of the bracket 81 of the counting mechanism CM, as best shown in Figure 12 and a gas control disk 97 is secured to the camshaft on one side of the hub portion. A counting ratchet wheel 99 having twenty-five teeth and a rocker arm 101 are rotatably mounted on a reduced diameter hub portion of the bracket 81 and retained thereon by a retaining collar 103 secured thereto through which the end camshaft 85 projects, a collar 105 being secured to the camshaft adjacent the retaining collar 103. A stop pawl 107 is pivoted at 109 to the bracket 81 and is urged by a spring 111 into engagement with the teeth of the ratchet 99 to prevent backward movement thereof. An indexing pawl 113 is pivoted at 115 to the rocker arm 101 and urged by a spring 116 into contact with an arcuate hub surface 116' of bracket 81 of the same diameter as the periphery of the ratchet 99 and alongside the lower portion thereof and toward the teeth of the ratchet to advance it one tooth at a time for each successive indexing movement of the liners 11. A shutoff lever 117 is also pivoted at 118 to the rocker arm and provided with a guide pin 119 projecting inwardly into an annular guide groove 121 in the adjacent face of the ratchet wheel 99 and a spring 122 urges the guide pin 119 radially inwardly so that the guide pin 119 enters a connecting slot 123 extending angularly inwardly from the annular guide slot and enters a concentric arcuate guide slot 125 in the ratchet 99 and into contact with an abutment 126 on the gas control disk to cause closure of the gas valves when the liners are indexed to the last port cutting position. As best seen in Figure 11 an arcuate shaped shield 127 is pivoted at 129 to the bracket 81 alongside the ratchet wheel 99 and is provided with an outer arcuate surface of the same radius as the inner edge of the annular guide groove 121 in the ratchet wheel 99 to prevent entrance of the guide pin 119 of the shut-off lever into the transfer slot 123 except when the liners are indexed to the last position immediately adjacent to the starting position. A spring 133 is placed between the shield and bracket and urges a stop surface 134 on the shield into contact with a stop surface on the bracket to position the outer arcuate surface of the shield in flush relation with the inner edge of the groove 121 in the ratchet wheel 99. A connecting rod 135, as best shown in Figure 4, is pivotally connected at one end to the rocker arm 101 and the other end of this rod is slidable in a sleeve 137 pivoted at 139 to one leg of a bell crank 141 pivoted at 143 to the upstanding portion 83 of the frame 1. Springs 144 and 145 are placed in the rod 135 at either end of the sleeve 137 between adjusting nuts 146 threaded on the rod. The other leg of the bell crank 141 is slotted and a longitudinally adjustable link 147 having a pivot pin 148 at the upper end is slidable in this slotted end of the bell crank. The lower end of the link 147, as best shown in Figures 2 and 7, is pivoted by a pin 149 to the right-hand indexing ratchet wheel 69.

The automatic control means for the above described machine comprises electric switches LS1, LS2, LS3 and LS10 secured to the template ramp 53 and switches LS4, LS5, LS6, LS7, LS8 and LS9 secured to the template 41 as best shown in Figures 3 and 16, each of these switches having an actuating member operated upon contact and movement of the magnetic roller 39. Limit switches LS11 and LS12 are shown secured on the rear of each of the drilling mechanisms and are operable by retraction of the drills and limit switches LS13 and LS14 are secured to the front of each of drilling mechanisms and are operable upon completion of the drilling operations on the liners 11. A high pressure oxygen control switch LS15 and an automatic stop switch LS16 are secured on the bracket 81 of the index counter and shut down mechanism, as best seen in Figure 12. The actuating member of the high pressure oxygen control switch LS15 is moved to the switch closing position by a plunger 150 and a spring 151 in an opening in a bracket 81 when the plunger enters a notch 153 in the ratchet wheel 99 when in the liner loading position and the actuating member of a stop switch LS16 is moved upon contact of a pin 155 in the side of the gas control disk 97 at the end of the last liner port burning operation to open the switch LS16. Electromagnetic valves SHPO, SLPO and SA are shown in Figure 16 provided in the high and low pressure oxygen and acetylene lines between the gas valve 87 and torches 17 and a hydrogen pilot line is shown extending between the gas valve to a point adjacent the tip of each torch 17. As previously mentioned a four-way electropneumatic reversing valve SRV is shown connected in an air pressure line for the ramp operating cylinder 59. An electropneumatic pressure application and relief valve SIV is shown, in Figures 1 and 16, in an air pressure line for an air trigger cylinder AC1, shown mounted on the frame 1 in Figure 2, and having an air ejected plunger 156 operating the movable element 157 of a four-way reversing valve V1 in the pressure line for the two-way cylinder AC2 for left-hand indexing detent, a spring, not shown, retains the plunger retracted. The movable element 157 of the valve V1, shown in Figure 2 mounted on the frame 1, is movable the opposite way by a stop C1 secured on the rack 63 of the indexing cylinder 61. Another four-way reversing valve V2 is shown connected in a pressure line to the two-way cylinder for the right-hand indexing detent. The movable element 159 of the reversing valve V2, shown secured to the frame 1 in Figure 2, is movable to opposite reversing positions by stops C2 and C3 also secured to the rack 63 of the indexing cylinder as best seen in Figure 2. Separate four-way electropneumatic reversing valves SDLH and SDRH are shown in the separate air pressure lines leading to each of the drilling mechanisms DM to feed and to retract the drills.

Figure 17:
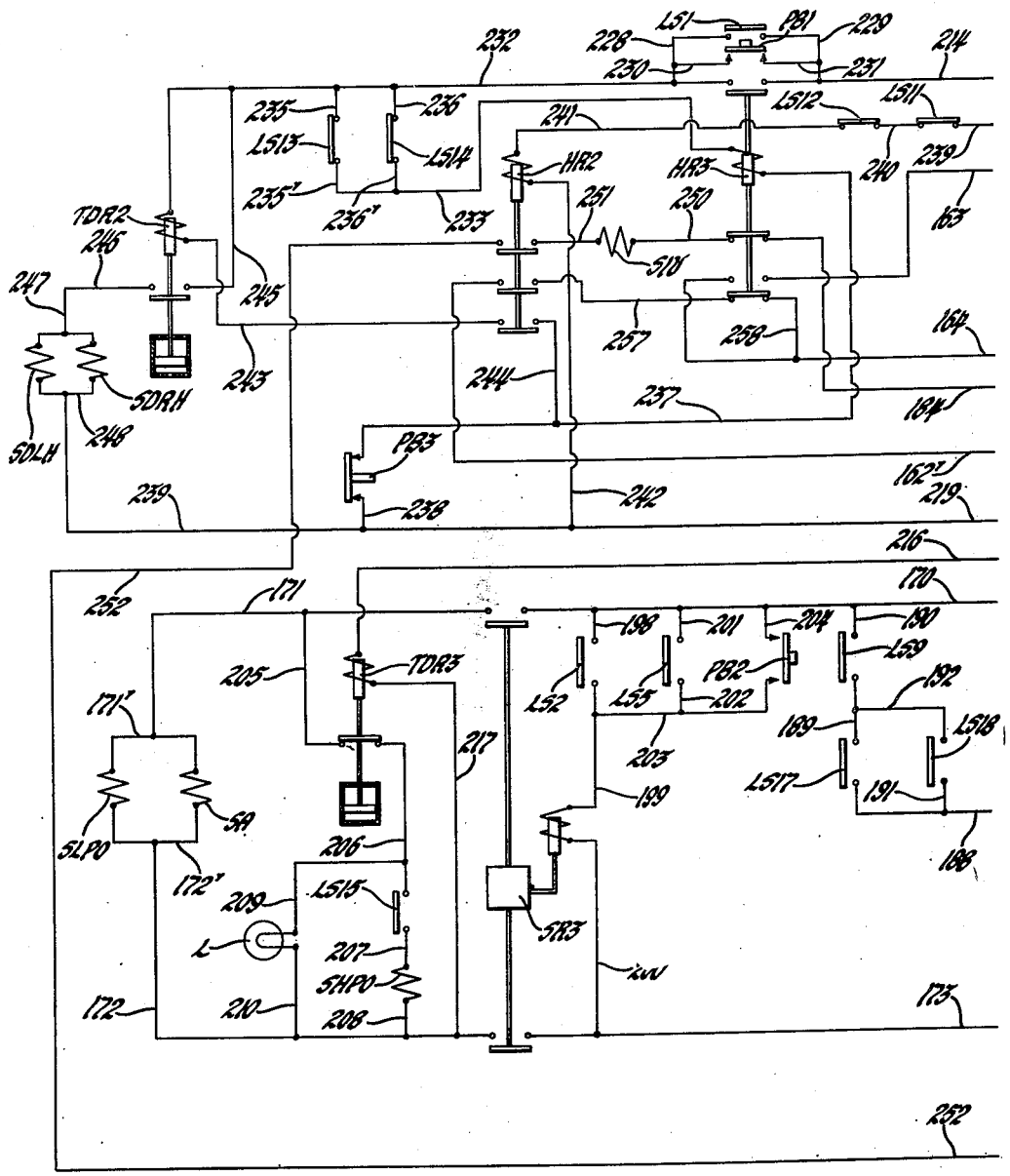
Figure 17 is one half of a schematic wiring diagram showing the electrical control apparatus and circuit connections.
Figure 17A:
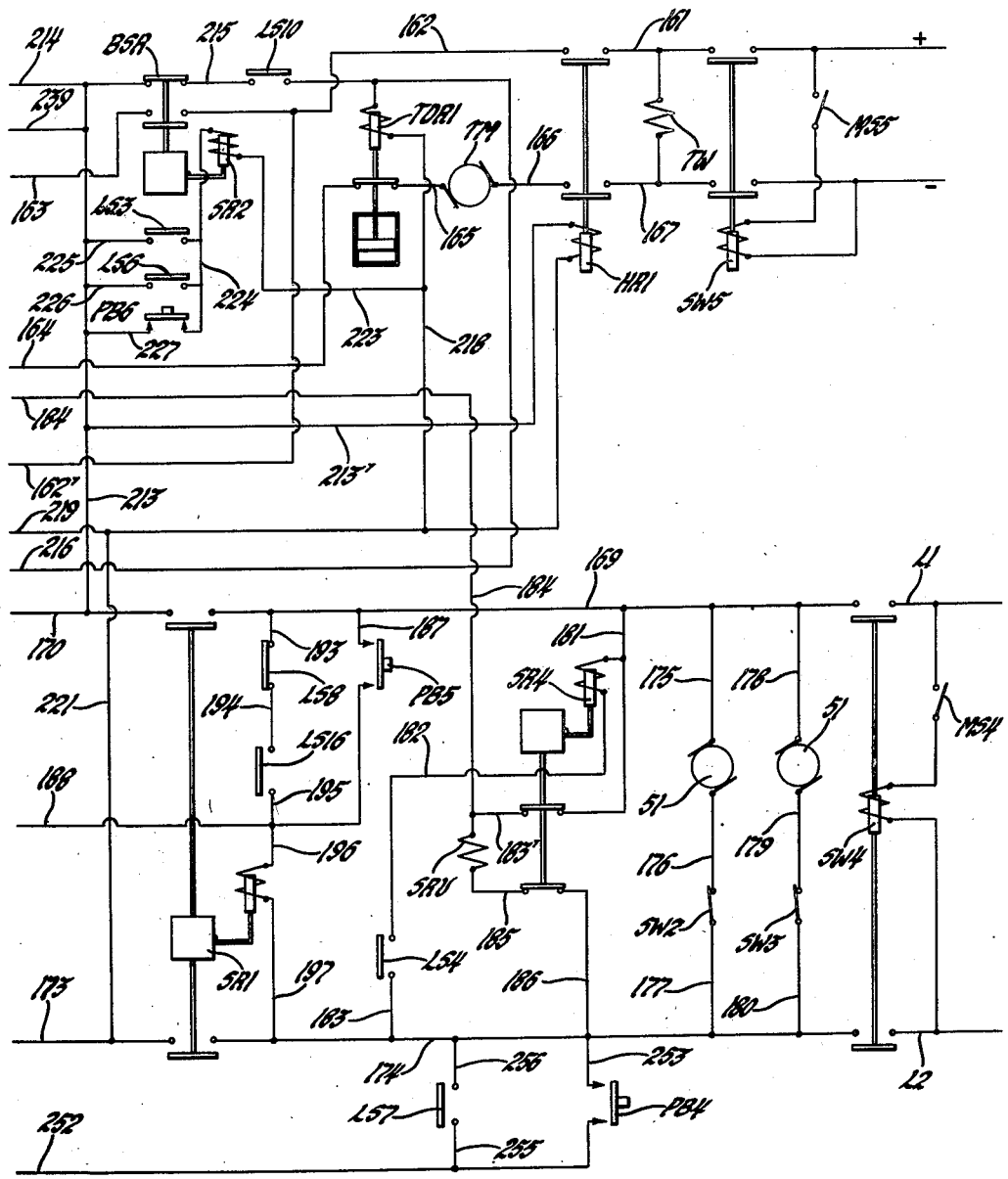
Figure 17a is the other half of Figure 17.

The electromagnetic roller 39, magnet winding T and tracer motor TM driving this roller is energized from a direct current line shown in Figure 17. The tracer motor TM is connected in series with the upper pair of normally open contacts of an electromagnetic main switch SW5 and a holding relay HR1, the lower normally open contacts of a sequence relay SR2, the central pair of normally open contacts of a holding relay HR3, the normally closed contacts of a time delay relay TDR1 and the lower normally open pair of contacts of the holding relay HR1 and main D. C. switch SW5 across the positive and negative conductors of the direct current line by conductors 161, 162, 163, 164, 165, 166 and 167. The magnetic winding TW of the tracer roller 39 is shown connected directly between the conductors 161 and 167. A stop-start push button main control switch MS5 is connected in series with the winding of the main D. C. switch SW5 across the direct current line to control energization and de-energization of the tracer motor TM and winding TW of the magnetic roller driven thereby. The lower closed contacts of the holding relay HR3 and open central contacts of the holding relay HR2 are connected in series between conductors 162 and 164 by conductors 162′, 257 and 258.

The other control apparatus is connected with an alternating current line conductors L1 and L2. The normally open and lower upper contacts of a main electromagnetic switch SW4, an off-on sequence relay SR1 and a sequence relay SR3 are connected in series with the alternating line conductors L1 and L2 by conductors 169, 170, 171, 172, 173 and 174, the windings of the low pressure oxygen valve SLPO and acetylene valve SA being connected in parallel between the conductors 171 and 172 by conductors 171′ and 172′. A drill motor 51 is connected in series with a manually operable switch SW2 between conductors 169 and 174 by conductors 175, 176 and 177 and the other drill motor 51 is connected in series with another manually operable switch SW3 between the conductors 169 and 174 by conductors 178, 179 and 180. The winding of another sequence relay SR4 is connected in series with the normally open switch LS4 between conductors 169 and 174 by conductors 181, 182, and 183. The winding SRV of the reversing valve for the ramp cylinder 59 is connected in series with the normally closed upper and lower contacts of the relay SR4 between conductors 169 and 174 by conductors 181, 183′, 185 and 186. A normally open index check push button switch PB5, and the left-hand index detent switch LS17 which is normally open when the left-hand detent 77 is in an index slot and the normally open index check switch LS9 are connected in series between conductors 169 and 170 by conductors 187, 188, 189 and 190. The right-hand index detent switch LS18, which is closed when the right-hand detent 77 is in a detent slot is connected in parallel with the switch LS17 by conductors 191 and 192. The normally closed switch LS8, serving as a stop switch and the normally open automatic stop switch LS16 in the index counter mechanism CM are connected in parallel with the push button switch PB5 by conductors 193, 194 and 195 between conductors 169 and 188. The winding of the sequence relay SR1 is connected by conductors 196 and 197 between conductors 188 and 174. The winding of the sequence relay SR3 is connected in series with the normally open switch LS2, serving as the gas turn on switch, between conductors 170 and 173 by conductors 198, 199 and 200. The open switch LS5, serving as the gas turn off switch and an open push button switch PB2 are connected in parallel with the switch LS2 by conductors 201, 202, 203 and 204 between conductors 170 and 199. The normally closed contacts of a time delay relay TDR3 are connected in series with the open switch LS15, serving as the high pressure oxygen control switch, and the winding of the high pressure oxygen valve SHPO by conductors 205, 206, 207 and 208 between conductors 171 and 172. A signal lamp L is connected in parallel with the switch LS15 and winding of the valve SHPO by conductors 209 and 210 between conductors 206 and 172. The windings of the low pressure oxygen and acetylene valves SLPO and SA are connected in parallel relation by conductors 171' and 172' between conductors 171 and 172. The winding of the time delay relay TDR3 is connected in series with the normally closed upper contacts BSR of the sequence relay SR2 and the open switch LS10, serving as a time delay set switch between conductors 170 and 172 through conductors 213, 214, 215, 216 and 217. One winding terminal of the time delay relay TDR1 is connected to the conductor 216 and the opposite terminal is connected by conductors 218, 219 and 221 to the conductor 173. The winding of the holding relay HR1 is connected between conductors 213 and 219 by a conductor 213'.

One winding terminal of the sequence relay SR2 is connected to the conductor 218 by a conductor 223 and the opposite terminal is connected by a conductor 224 to one contact of each of the open switches LS3, LS6 and to one contact an open push button switch PP6. Each of the other switch contacts are connected by separate conductors 225, 226 and 227 to conductor 213. The switch LS3 serves as the tracer motor control switch, the switch LS6 serves as the tracer motor delay control switch and the push button PB6 serves to control operation of the sequence relay SR2.

An open push button control switch PB1 for the drill motors 51 and the open starting control switch LS1 for these motors are connected in parallel by conductors 228, 229, 230, 231 and 232 across the normally open upper contacts of the holding relay HR3. One winding terminal of the relay HR3 is connected to a conductor 233 and the open switches LS13 and LS14 are connected in parallel by conductors 235, 235', 236, 236' between the conductors 233 and 232. The switches LS13 and LS14 serve as drill feed limit switches for the drilling mechanism DM. The other winding terminal of the relay HR3 is connected in series by conductors 237 and 238 with an open push button switch PB3 to conductor 219 for controlling the feed and retraction of the drilling mechanisms DM.

The open switches LS11 and LS12, serving as retracting limit switches for the drilling mechanisms DM, are connected in series with the winding of a holding relay HR2 between conductors 213 and 219 by conductors 239, 240, 241 and 242. The winding of a time delay relay TDR2 is connected in series with the open lower contacts of relay HR2 by conductors 243 and 244 between conductors 232 and 237. The open contacts of the relay TDR2 are connected in series by conductors 245 and 246 between the conductor 232 and a conductor 247 connected to one winding terminal of each of the electromagnetic reversing valves SDLH and SDRH of the drilling mechanisms DM, the opposite winding terminals of these valves are connected by conductor 248 to conductor 219.

The upper closed contacts of relay HR3, the winding of the solenoid valve SIV, the upper open contacts of relay HR2, and the open push button switch PB4, serving as a manual index switch are connected in series by conductors 184, 250, 252 and 253 between the upper winding terminal of the electropneumatic valve SRV and conductor 174. The open switch LS7, serving as an index trigger switch is connected by conductors 255 and 256 in parallel with the switch PB4 between conductors 252 and 174. The open contacts, second from the bottom of relay HR2, and the lower closed contacts of relay HR3 are connected in series between the conductors 162' and 194 by conductors 257 and 258.

With the cylinder liners 11 centered in the chucks 5 and the electromagnetic tracer roller 39 indexing mechanism in the first or starting position as shown in Figures 2 and 16 the handle 93 of the gas valve 87 on the valve camshaft 85 is rotated to open the hydrogen pilot, low and high pressure oxygen and acetylene valves 89, 90, 91 and 92 and the hydrogen pilots are lighted adjacent the torches 17. Closure of the main off-on push button switches MS4 and MS5 causes energization of the windings of the main D. C. and A. C. line switches SW5 and SW4 and each of the upper and lower contacts thereof close as these push button switches are shown connected in series with a main switch winding across each line.

Closure of the contacts of the main A. C. switch SW4 causes energization of both drill motors 51, one being energized through conductors 169, 175, 176, 177 and 174 providing the manual control switch SW2 therefor is closed and the other drill motor being energized through conductors 169, 178, 179, 180 and 174 providing the manual control switch SW3 therefor is closed. Energization of the winding of the electropneumatic ramp valve SRV also takes place through both of the closed contacts of the sequence switch SR4 and conductors 169, 181, 183', 185, 186 and 174 to cause upward movement of the ramp 53 into opening of the template 41 by the action of the ramp cylinder 59 and plunger 58 therein.

Closure of the contacts of the main D. C. switch SW5 in the D. C. line causes energization of the winding TW of the electromagnetic tracer roller 39 through D. C. conductors 161 and 167 causing the roller to be magnetized and move into driving contact with the wall of the opening of the template 41 to the position shown in Figure 16.

Momentary closure of the manual start-stop push button switch PB5 momentarily energizes the winding of the off-on sequence relay SR1 through conductors 169, 187, 188, 196, 197 and 174 and the contacts thereof move to the closed position and remain in this position. This causes energization of the winding of the holding relay HR1 for the tracer motor TM and closure of the contacts of relay HR1 and energize the winding of the holding relay HR2 for causing feed and retraction of the drilling mechanisms. Energization of the winding of the relay HR1 is through the closed contacts of the relay SR1 and conductors 170, 213, 213', 219, 221 and 173. Energization of the winding of the relay HR2 also takes place through the switches LS11 and LS12 on the rear of the drilling mechanisms, which switches are closed when the drills are fully retracted, and through A. C. conductors 170, 213, 239, 240, 241, 242, 219, 221 and 173 and this causes closure of all three contacts of the relay HR2. Closure of the control contacts of the relay HR2 causes energization of the tracer motor TM through these contacts, the closed central contacts of the relay HR2, the closed lower contacts of holding relay HR3, the closed contacts of time delay relay TDR1 and D. C. conductors 162, 162', 257, 258, 164, 165, 166 and 167. This causes starting of the tracer motor TM and rotation of the magnetized electromagnetic tracer roller 39 counterclockwise so that the tracer mechanism TM moves clockwise within the template opening, causing the torches 17 to follow movement of the tracer mechanisms as they are also secured to the supporting bar 19. Closure of the other two sets of contacts of the holding relay HR2 sets up circuits for the feeding and retracting control mechanism for the drills and for the indexing mechanism.

The roller 39 first contacts the actuating member in the template 41 for the index check switch LS9 and causes closure thereof and if the switches LS17 and LS18 are open upon full entry of both detents 77 into the starting notches of the index plates 71 the tracer roller 39 climbs up the toe of the ramp 53 now in the template opening. Should either of the switches LS17 or LS18 be closed by failure of either detent to enter a notch in the indexing plates a circuit is established through the index check switch LS9 and either the switches LS17 or LS18 and A. C. conductors 170, 190 and 189, 188, 196, 197 and 174 or 170, 190 and 189, 190, 191, 188, 196, 197 and 174 to reenergize the winding of the sequence relay SR1 and the contacts open to deenergize and stop the tracer motor TM. Therefore if both detent switches LS17 and LS18 are open the tracer motor continues to drive the tracer roller.

The tracer roller 39 next contacts and moves the actuating member of the time delay set switch LS10 in the toe of the ramp to cause closure of the switch LS10. This causes energization of the winding of the time delay relay TDR1 through the upper closed D. C. contacts of the sequence relay SR2 and A. C. conductors 213, 214, 215, 218, 219, 221 and 173. This causes the contacts of the relay TDR1 to open and deenergize tracer motor TM and the roller to coast into contact with the actuating member of the switches LS1, LS2, and LS3 and also remain in contact with the actuating member of the switch LS10 holding all of these switches closed. A circuit is also set up upon closure of the time delay set switch LS10 through conductors 216, 217 to conductor 172.

Closure of the switch LS1, serving as a drilling mechanism start switch, causes energization of the winding and closure of the contacts of time delay relay TDR2 and the winding of the holding relay HR3. Energization of the winding of the relay TDR2 taking place through the switch LS1, the closed lower contacts of the holding relay HR2, the normally closed contacts of the manual stop push button switch PB3 for the drill mechanisms DM and A. C. conductors 214, 229, 228, 232, 243, 244, 237, 238, 219, 221 and 173. Closure of the contacts of the time delay relay TDR2 causes energization of the electropneumatic valves SDLH and SDRH through these contacts and A. C. conductors 232, 245, 246, 247, 248, 239 and 219 to cause feed of the drills 45 into the respective cylinder liners 11 by action of the pneumatic feed mechanisms of the drill feed and retracting mechanisms for the drilling mechanisms DM. As the drills 45 move on the feed stroke the switches LS11 and LS12 on the back of the mechanisms are opened to deenergize the winding of the holding relay HR2 and its contacts fall to the position shown and also to deenergize the winding of the time delay relay TDR2 the contacts of which are delayed in opening and when these contacts open the windings of the electropneumatic valves SDLH and SDRH are deenergized to cause reversal of these valves to cause reversal of the drilling mechanisms DM and retraction of the drills and reclosure of the switches LS11 and LS12. This causes reenergization of the winding of the relay HR2 and closure of the contacts thereof which causes reenergization of the time delay relay TDR2 to cause another feeding operation of the drills. Alternate feed and retraction of the drills continues in the above described manner until the drills break through each of the cylinder liners. Momentary energization of either the drilling mechanism control switches LS1 or the push button switch PB1 through the normally closed switches LS13 and LS14 on the forward end of the drilling mechanisms and A. C. conductors 232, 235, 236, 235', 236', 233, 237, 238, 219, 221 and 173 and the normally closed push button switch PB3 causes closure of the upper contact of relay HR3 to keep the windings of the relay TDR2 and the valves SDLH and SDRH for the drilling motor energized. When the winding of relay HR3 is energized the second contacts from the bottom of this relay also close to set up a D. C. holding circuit to the tracer motor TM. When both drills break through the liners both drill feed limit switches LS13 and LS14 on the forward side of the drilling mechanisms DM are opened as the drills are at the maximum feed position and break through. Opening of the switches LS13 and LS14 caused energization of the winding of the holding relay HR3 and the opening of the upper contacts thereof to deenergize the valve windings SDLH and SDRH to cause full retraction of the drills and opening of the second contacts from the bottom opens the D. C. holding circuit to the tracer motor TM.

Closure of the switch LS2, serving as turn on gas switch, causes energization of the winding of the sequence relay SR3 through A. C. conductors 170, 198, 199, 200 and 173 and the relay contacts close. This causes energization of the windings of the electromagnetic low pressure oxygen and acetylene valves through A. C. conductors 170, 171, 171', 172', 172 and 173 causing the opening of these valves and flow of low pressure oxygen and acetylene to the torches 17 and ignition of these gases by the hydrogen pilot flame to preheat the cylinder liners 11. Closure of the contacts of the relay SR3 completes the circuit previously set up to the winding of the time delay relay TDR3 and sets up a circuit to the winding of the high pressure oxygen valve SHPO and signal lamp L including the open contacts of the relay TDR3, the open contacts of the high pressure oxygen switch LS15 on the index counter mechanism and A. C. conductors 171, 205, 206, 207, 208, 209, 210 and 172. The high pressure oxygen control valve cannot be energized to open as the switch LS15 is open and no high pressure cutting oxygen can flow to the torches 17 at this time.

Closure of the switch LS3, serving as a tracer motor control switch, causes energization of the winding of the sequence relay SR2 through A. C. conductors 213, 225, 224, 223, 218, 219 and 221, and this causes the upper contacts of the relay to open and deenergize the windings of the time delay relays TDR1 and TDR3 to cause delayed reclosure of the contacts thereof. The contacts of the relay TDR1 are arranged to reclose in seven seconds to cause restarting of the tracer motor and the contacts of the relay TDR3 are arranged to reclose in six seconds to set up a circuit to the winding of the electromagnetic high pressure or cutting oxygen valve SHPO and signal lamp L through the open oxygen control switch LS15 on the ratchet counting mechanism. As mentioned the switch LS15 is open when the index counting mechanism CM is in the starting position as then the actuating member of the high pressure oxygen control switch LS15 on the index counting mechanism CM is opened by the spring 151 moving the plunger 150 into the notch 153 in the face of the ratchet wheel 99. In all other positions of the ratchet wheel the switch LS15 is closed. As explained closure of the tracer motor control switch LS3 causes energization of the winding of the sequence relay SR2 through A. C. conductors 214, 213, 225, 224, 223, 218 and 219 causing the lower D. C. contacts of the relay SR2 to close which sets up a circuit through D. C. conductors 161, 162, 163, 164 and 165 to the tracer motor TM and through the lower closed A. C. contacts of the sequence relay SR2 and the now open contacts of the time delay relay TDR1 which close after a seven second interval to restart the tracer motor. This causes the tracer roller 39 to move out of contact with the actuating member of the switches LS1, LS2, LS3 and LS10 causing all of these switches to open. Opening of the gas control switch LS2 causes deenergization of the winding of the sequence relay SR3 but its contacts remain closed and opening of the switch LS3 causes deenergization of the winding of the sequence relay SR2. The tracer roller then rolls off the heel of the ram 53 and next contacts and moves the actuating member of the switches LS4, LS5 and LS6 to cause closure thereof.

Closure of the switch LS4, serving as a ramp control switch, causes energization of the winding of the sequence relay SR4 through A. C. conductors 169, 181, 182, 183 and 174. This causes opening of the contacts of the relay SR4 to cause deenergization and reversal of the electropneumatic ramp valve SRV and the ramp 53 is withdrawn from the template opening by reverse action of the ramp plunger 58.

Closure of the gas control switch LS5 causes the second energization of the winding of the sequence relay SR3 through A. C. conductors 170, 201, 202, 203, 199, 200 and 173 which causes its contacts to remain closed and keep the electromagnetic low pressure oxygen and acetylene valves SLPO and SA energized and open.

Closure of the switch LS6, serving as a tracer motor delay switch, causes reenergization of the winding of the sequence relay SR2 through A. C. conductors 170, 213, 226, 224, 223, 218, 219, 221 and 173 to cause the lower D. C. contacts of the relays SR2 to remain closed and keep the tracer motor energized and operating so that the tracer roller rolls over the actuating member of the switches LS4, LS5 and LS6 without hesitation and continues around the opening in the template 41. The tracer roller next contacts and moves the actuating member of the switches LS7 and LS8 moving the switch LS7 to the closed position and moving the switch LS8 to the open position.

Closure of the switch LS7, serving as an index trigger switch, sets up a circuit including the winding of the ramp valve SRV, the upper contacts of holding relay HR2, which are opening and closing as the drilling mechanisms move back and forth on the feed and retracting strokes, the winding SIV of the valve controlling index triggering air cylinder AC1, the normally upper contacts of the holding relay HR3, which are open as the winding is energized and the contacts of sequence relay SR4 which are open. Thus as long as the contacts of the relay SR4 are open and the ramp is moved down the winding of the valve SIV cannot be energized to cause indexing of the liners. Also as long as the drilling mechanisms DM are on the feeding stroke the switches LS11 and LS12 are open and the winding of the relay HR2 is deenergized and its contacts are open.

Opening of the normally closed switch LS8, serving as an automatic stop switch, interrupts a circuit including the stop switch LS16 on the index counting mechanism CM, which is open now and closed only when this mechanism is in the last indexing position, the winding of the relay SR1 and A. C. conductors 169, 193, 194, 195, 188, 196, 197 and 174. The above operation of the switches LS7 and LS8 causes no operating changes and the tracer roller continues on around the template opening and contacts and moves the actuating member of the index check switch LS9 a second time causing the second closure thereof.

Reclosure of the index check switch LS9 provides an additional checking operation for the index detents 77 and if still fully engaged in the notches in the index plates 71 the detent switches LS17 and LS18 are still open and closure of the switch LS9 does not stop movement of the tracer roller and it continues on around the template opening as the ramp now is withdrawn downwardly therefrom. The tracer roller next contacts and moves the actuating member for the switches LS4, LS5 and LS6 for the second time causing reclosure thereof for the second time.

The second closure of the ramp control switch LS4 energizes the winding of the relay SR4 and its contacts close to energize the winding of the ramp valve SRV which again causes the ramp to be moved upwardly into the template opening by reverse action of the ramp cylinder and plunger 58 and 59.

The second closure of the gas control switch LS5 causes reenergization of the winding of the sequence relay SR3 for the third time causing its contacts to open and deenergize the windings and cause closure of the low pressure oxygen and acetylene valves SLPO and SA.

The second closure of the tracer motor delay switch LS6 causes energization of the winding of the sequence relay SR2 for the third time causing the lower D. C. contacts to open and the upper A. C. contacts to close.

Opening of the lower D. C. contacts of the relay SR2 stops the tracer motor TM with the roller in contact with the actuating member of the switches LS4, LS5 and LS6 closed. Thus the tracer motor is stopped and the supply of low pressure oxygen and acetylene is discontinued to the torches and both drilling mechanisms DM still operating.

As explained when both drills 45 break through the liners 11 both of the switches LS13 and LS14 on the forward end of these mechanisms open causing deenergization of the winding of the holding relay HR3 and its contacts to fall to the normal position as shown in Figure 17. The opening of the upper contacts of the relay HR3 deenergizes the windings of the electropneumatic reversing valves SDLH and SDRH for the drilling mechanisms DM causing full retraction of the drills which causes closure of the switches LS11 and LS12 on the rear of these mechanisms. This causes energization of the winding of the holding relay HR2 and its contacts close and remain closed.

Closure of the contacts second from the bottom of the relay HR2 and the lower contacts of the relay HR3 causes restarting of the tracer motor TM. Closure of the contacts second from the top of relay HR3 sets up a circuit including the now closed contacts of the relay SR4, the windings SIV, closed upper contacts of relay HR2, open index trigger switch LS7 and A. C. conductors 169, 181, 183', 184, 250, 251, 252, 255, 256 and 174 and when the tracer roller next passes over the actuating member of the switches LS7 and LS8, causing the index trigger switch LS7 to be closed momentarily and the automatic stop switch LS8 to be opened momentarily for the second time.

Momentary closure of the index trigger switch LS7 completes momentarily the circuit set up to the winding SIV of the valve of the index trigger cylinder AC1 and it receives a puff of air pressure causing the plunger 156 to move out and move the movable element 157 of the reversing valve V1 to the reverse position from that shown. This causes air pressure to enter the left hand detent cylinder AC2 to withdraw detent 77 from LH indexing plate 71 and air pressure to enter the indexing cylinder 61 and cause the rack 63 to move to the left causing the left hand gear segment 67, ratchet 69, pawl 73, index plate 71, spindle 7 and liner 11 to be indexed 105° clockwise. The stop C1 on the rack 63 contacts and moves the movable element 157 of valve V1 to the reverse position to reverse movement of the detent in the left detent cylinder and the rack. This causes the left hand detent 77 to enter a different notch in the left hand index plate 71 and hold it in this position. At the same time the valve V1 was reversed by the stop C1, another stop C2 on the rack moves the movable element 159 of the valve V2 to apply air to the right hand detent cylinder AC2 and withdraw the right hand detent and the rack 6 in moving to the right causes the right hand gear segment 67, ratchet 69, pawl 73, index plate 71, spindle 7 and liner 11 to be indexed 105° counterclockwise. Movement of the rack to the right causes another stop C3 on the rack to contact and move the movable element 159 of the valve V2 to its original position, as shown, to apply air pressure to the right hand detent cylinder AC3 and cause the detent 71 to enter another notch in the right hand indexing plate. During this time the puff of air applied to the index trigger cylinder AC1 has leaked off and is spring returned to its normal position as shown.

During clockwise movement of the right hand ratchet 69 and linkage 147, 141 and 135 interconnecting the right hand ratchet 69 to the rocker arm 101 of the counting mechanism move the rocker arm 101 clockwise as viewed in Figure 11. The indexing pawl 113 on the rocker then rides the lower arcuate extremity of the hub portion 116' of the bracket 81 and enters one tooth of the ratchet 99 to advance it clockwise one tooth only. Return counterclockwise movement of the rocker arm 101 by return counterclockwise movement of the indexing ratchet 69 causes the indexing pawl 73 on the rocker to ride back onto the hub surface 116' of the bracket. The stop pawl 107 prevents counterclockwise movement of the ratchet 99. The shield 127 of the index counting and shut down mechanism CM prevents entry of the guide pin 119 into the connecting slot 123 of the ratchet wheel 99 and rides the inner surface of the guide groove 121 and outer arcuate surface of the shield 127 for both directions of rotation of the rocker arm 101. As explained this one tooth of movement of the ratchet of the counting mechanism CM causes closure of the high pressure oxygen control switch LS15 thereon and it stays closed in all positions except the loading and starting position of the spindles 7 and starting position of the counting mechanism, as shown in the drawings, so that high pressure or cutting oxygen will be supplied to the torches upon the next closure of the gas control switch LS2 in the ramp 53 and on all subsequent indexing cycles as holes have now been drilled in the liners and each hole is now indexed in alignment with each torch, and while the ports are being flame cut starting from these holes other holes are being drilled in the liners for each successive indexing of the liners.

The momentary opening of the automatic stop switch LS8 by the tracer roller has no effect at this time as the automatic stop switch LS16 on the counter mechanism is now open and will remain open until the liners have been indexed to the last position and the last ports flame cut therein.

The tracer roller rolls around the template while the above indexing operation occurred and again closes the index check switch LS9 and proceeds on around the template if both detents 77 are in the notches of the index plates 71 and again rolls up the toe of the ramp 53 and closes the time delay set switch LS10 to energize the windings and cause opening of the time delay relays TDR1 and TDR2 to stop the tracer motor in a position to hold the switches LS10, LS1, LS2 and LS3 closed as previously described. The resulting action caused by closure of switches LS10, LS1, LS2 and LS3 in this case differs from that previously described as the high pressure oxygen control switch LS15 on the index counting mechanism is now closed. As explained closure of LS10 again energizes the windings of the time delay relays TDR1 and TDR2 for delayed closure of the contacts thereof. Delayed closure of the relay TD2 starts the second drilling operation. Closure of the gas turn on switch LS2 causes reclosure of the contacts of the sequence relay SR3 which energizes the low pressure oxygen and acetylene valves and they open to preheat the edges of the drilled holes in the liners. Delayed closure of the time delay relay TDR3 then causes energization of the high pressure cutting oxygen valve SHPO through the now closed switch LS15 and the signal lamp and two more holes are drilled in the liners while cutting of the first ports are being flame cut. It will be noted that when the tracer roller is in contact with the switches LS1, LS2, LS3 between the toe in the ramp and the torches are accordingly directed axially with respect to the previously drilled holes after indexing thereof. This is the start of the second cycle of the tracer roller.

The roller again moves down the heel of the ramp and closes switches LS4, LS5 and LS6 to again cause withdrawal of the ramp and repeat all the circuit connection changes previously described. The roller continuing without hesitation past switches LS7, LS8, LS9, missing switches LS1, LS2 and LS3 as the ramp is withdrawn from the template and continues on around the template opening during which time other holes are being drilled in the liners and rectangular ports are being burned in the liners from the previously drilled holes.

Upon closure of the switches LS4, LS5 and LS6 the preheating and cutting gases are turned off and the tracer motor is stopped until the second drilling operation is completed after which the second indexing operation takes place. On the twenty-fifth cycle of the above described the drills enter the first flame cut ports and close the feed limit switches LS13 and LS14 and return to the retracted position and there is no delay at the end of the last port burning operation to permit break through of the drills.

Figure 13:
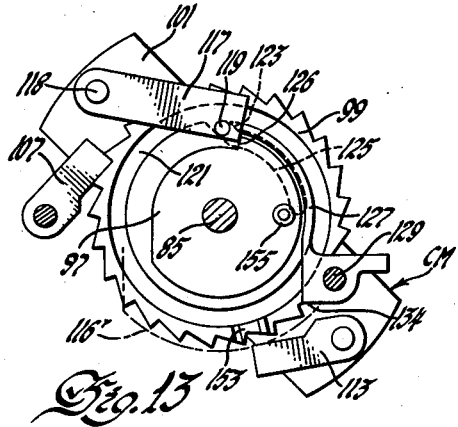
Figures 13, 14 and 15 are views showing certain of the parts of Figure 11 in different positions.
Figure 14:
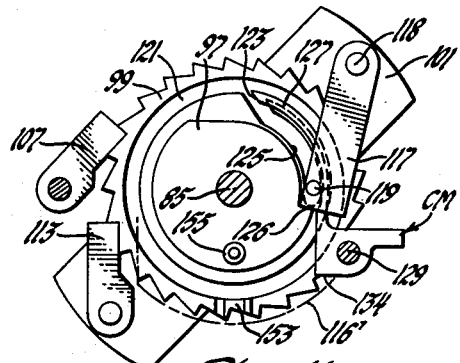
Figure 15:
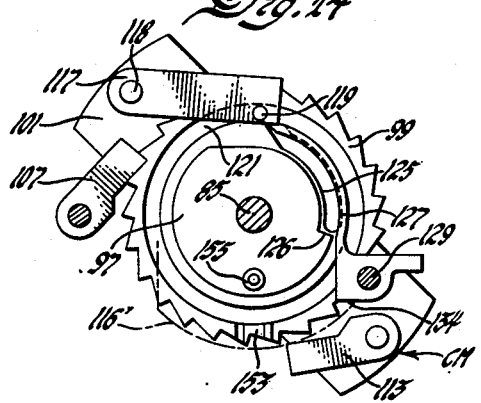

When the tracer roller contacts the index trigger and automatic stop switches LS7 and LS8 when the twenty-fourth and last port in the liners is being flame cut the liners are indexed to the last or starting position. The ports of counter-mechanism CM at the end of the last or twenty-fourth port burning operation are shown in Figure 13, and when the liners are indexed to the first or starting position the guide pin 119 falls in the connecting slot in the counter ratchet 99 as shown in Figure 13, and moves to the end of the arcuate slot 125 therein striking the abutment on the gas control disk 97 and turning off the high and low oxygen, acetylene and hydrogen pilot valves 92, 90, 91 and 89 before the automatic switch LS16 on the counter-mechanism is closed and the high pressure oxygen switch LS15 is opened in the starting position.

Closure of the automatic stop switch LS16 on the counter-mechanism, in series with the automatic stop switch LS8 on the template, completes a circuit to the winding of the sequence switch SR1 causing its contacts to open and cause the winding holding relay HR1 to be deenergized and its contacts to open deenergizing the tracer motor and it stops in the starting position between the stop switch LS8 and the index check switch LS9. Opening of the contacts of the relay SR1 causes deenergization of the winding of the holding relay HR2 and its contacts open but this has no effect as the winding of the holding relay HR3 is deenergized and its contacts are in the position shown. Opening of the contacts of the relay HR2 insures that the machine cannot be indexed accidentally. Closure of the automatic switch LS16 on the counting mechanism and in series with the automatic stop switch LS8 on the template has no effect as long as the tracer roller holds the switch LS8 open, therefore the roller will coast off the switch LS8 causing it to close and energize the winding of the sequence relay SR1 and its contacts will close in the starting position as shown. The machine operator then takes the liners having the ports cut therein off the chucks and places other liners in the chucks for the automatic drilling and port cutting operations described above.

We claim:

1. In a flame cutting machine, the combination of a machine frame, work supporting mechanism rotatable in the frame, indexing mechanism on the frame operably connected to the work supporting mechanism, a template on the frame having an opening therein, template tracer mechanism, a cutting torch supported on the frame for movement in a plane adjacent the supporting mechanism and connected to the tracer mechanism, said tracer mechanism having a rotatable tracer roller retained in driving engagement with the wall of the template opening for moving the torch, drilling mechanism on the frame in spaced relation to the cutting torch and a template ramp movable into the template opening and engageable by the tracer roller for positioning the cutting torch in alignment with holes drilled by the work piece drilling mechanism upon operation of the indexing mechanism to start the cutting operation by the torch.

2. In a cylinder port flame cutting machine, the combination of a machine frame having a coolant tank portion including an overflow pipe to maintain a constant level of the coolant therein, a cylinder supporting mechanism rotatable in the frame to retain the lower portion of the cylinder below the level of the coolant in the tank portion, work piece indexing mechanism on the frame operably connected to the cylinder supporting mechanism, a template having an opening therein, template tracer mechanism, a cutting torch connected to the tracer mechanism and movable in a plane above the cylinder supporting means, said tracer mechanism having a rotatable tracer roller retained in driving engagement with the wall of the opening in the template for moving the torch, drilling mechanism on the frame adjacent one side of the cylinder supporting means, and a template ramp movable into the template opening and engageable by the tracer roller for positioning the cutting torch in alignment with the drilled holes in the cylinder upon operation of the indexing mechanism.

3. In a flame cutting machine, the combination of a machine frame, work piece supporting mechanisms rotatable in the frame, work piece indexing mechanism on the frame operatively connected to the work piece supporting mechanisms, a template on the frame having an opening therein, template tracer mechanism having a tracer roller retained in driving engagement with the wall of said opening, a cutting torch movably mounted on the frame adjacent each work piece, supporting mechanism means interconnecting the tracer mechanism roller and torches to cause the torches to follow the movement of the roller, work piece drilling mechanisms, each mounted on the frame in angularly spaced relation to each torch, and a template ramp movably mounted on the frame into the opening in the template and engageable by the tracer roller for positioning the cutting torches in alignment with the drilled holes in the work pieces upon operation of the indexing mechanism to start the cutting operations on the work pieces by the torches.

4. In an engine cylinder port flame cutting machine, the combination of a machine frame having a coolant tank provided with an overflow pipe to maintain a constant level of the coolant in the tank portion, cylinder supporting mechanisms rotatable in the frame to retain the lower portions of the cylinders submerged in the coolant, work piece indexing means on the frame operably connected to the cylinder supporting mechanisms, work piece cutting torches, each movably mounted on the frame above cylinder supporting mechanisms, a template mounted on the frame having an opening therein, template tracer mechanism connected to the torches and having a tracer roller urged into driving engagement with the wall of the template opening for moving the torches, drilling mechanisms, each located on the frame alongside of a cylinder supporting mechanism for drilling a hole through a cylinder supported thereby and a template ramp movably mounted on the frame for entry into the opening in the template and engageable by the tracer roller for initially positioning each of the cutting torches in alignment with a previously drilled hole in a cylinder after indexing of the cylinder supporting mechanisms to start cutting operation by the torches.

5. In a flame cutting machine for cutting ports in engine cylinders, the combination of a machine frame, cylinder supporting chucks rotatably supported in the frame, power operated indexing mechanism on the frame operably connected to the chucks, power operated drilling mechanism on the frame adjacent each chuck for drilling holes in the cylinder supported therein, a cutting torch movably mounted on said frame adjacent each chuck and in spaced relation to each drilling mechanism, a template on the frame having an opening therein, power operated template tracer mechanism connected to the torches and having a driven magnetized roller in driving engagement with the wall of the template opening to cause the torches to follow movement of the tracer roller, a ramp movable on said frame, power means operably connected to the ramp for moving the ramp into and out of the opening in the template and engageable by the tracer roller to cause the torches to be moved into alignment with the drilled holes in the cylinders upon successive operation of the indexing means to start the cutting operations on the work pieces, a source of cutting gas for the torches, a cutting gas conduit including gas flow control means interconnecting the gas source and torches, power and gas flow controlling means on said template and said ramp connected to the power operated and gas flow control means and operable by passage of the roller and other power and gas controlling means interconnected with the first mentioned power and gas controlling means and operable by said indexing means to perform drilling and indexing operations upon the first passage of the tracer roller past the template ramp and around the template opening and simultaneous drilling and cutting operations followed by indexing upon a preselected number of passages of the roller past the ramp and around the template opening to form circumferentially spaced ports in the cylinders.

6. In a flame cutting machine for cutting ports in engine cylinders, the combination of a machine frame, cylinder chucks rotatable therein, power operated chuck indexing mechanism, indexing counting mechanism operably connected to the indexing mechanism and movable each time the power indexing mechanism is operated, power operated drill feeding and retracting mechanisms, each mounted on the frame alongside of a cylinder liner for drilling a hole therethrough, a cutting torch movably mounted on the frame in spaced relation to each drilling mechanism for cutting a port in each cylinder starting from a hole previously drilled therein, after indexing of the cylinder, a template on the frame having an opening therein to determine the shape of the port cut in the cylinders, a power operated magnetic roller magnetically retained in driving engagement with the wall of the template opening and operably connected to the torches to cause the torches to follow movement of the tracer mechanism, a ramp movable on the frame into and out of the opening in the template for magnetic driving engagement of the tracer roller to position the torches over the drilled holes in the cylinders to start the cylinder port cutting operation, power operated ramp moving means on the frame, separate sources of pilot, preheating and cutting gases for the torches, gas connections including gas supply and cut off means between each gas source and the torches, control connections for the operated and gas supply and cut off means, said control connections including power and gas supply controlling devices in spaced relation on the template and ramp operable upon contact by the tracer roller and other power and gas controlling devices operably connected to the index counting mechanism to cut a preselected number of circumferentially spaced ports in the cylinder liners and stop operation of the machine.

7. In a port cutting machine for engine cylinder liners, angularly movable chucks for removably securing and centering engine cylinder liners therein, electropneumatic chuck indexing mechanism operable intermittently for indexing the chucks from a liner loading and unloading position to a preselected number of indexing positions and back to the loading and unloading position, an electropneumatic drilling mechanism and a movable cutting torch adjacent each chuck to drill and flame cut a port in each liner at circumferentially spaced positions, a stationary template having an opening therein, an electrically operated template tracer mechanism having a rotatable tracer roller in driving engagement with the wall of the template opening to cause the mechanism to move in a closed path, said tracer mechanism being connected to the torches to cause the torches to follow movement of the tracer mechanism, a movable template ramp, electropneumatic ramp moving means for moving the ramp into and out of the template opening, said ramp when in the template opening being engageable by the tracer roller to position the torches in axial alignment with previously drilled holes in the liners after indexing thereof to start the port cutting operation, a plurality of electrical control switches disposed in spaced relation in said template and on said ramp operable separately and in combination by contact of the tracer roller when engaged with the template and ramp, separate torch pilot, liner preheating, and liner cutting gas supply lines including mechanical and electromagnetic valves for the torches, said electrical control switches and said mechanically operated valves operable by the indexing counter mechanism upon the start of indexing movement of the liners from and back to the liner loading position, a source of electrical energy, a manually operable energizing switch and electrical energizing and control connections interconnecting the above-mentioned electrical and electromagnetic means, electric control switches, and said energy source to perform drilling and preheating operations on the liners when in the loading position, drilling, preheating and cutting operations upon movement of the liners to each of a preselected number of liner indexing positions with exception to the last indexing position in which preheating and cutting operations are performed and for stopping of the tracer mechanism and flow of gas to the torches upon movement of the liners back to the loading position.

8. In an automatic port cutting machine for engine cylinder liners, angularly movable chucks for removably securing and centering cylinder liners therein, an indexing plate on each chuck having indexing notches therein, a pneumatically operated detent movable into and out of each of the respective notches in each indexing plate, an electric index switch operable by each detent upon movement into each indexing notch, pneumatically operated indexing mechanism operably connected to each indexing plate for moving the liners in steps from and back to a liner index loading and unloading position, pneumatic connections interconnecting the pneumatically actuated detents and indexing mechanism including a valve operable by the indexing mechanism to stop operation thereof and an electropneumatic valve to start operation thereof, a pneumatic drill feeding and retracting mechanism and a cutting torch movably mounted in angularly spaced relation with each liner for drilling and cutting ports at spaced points therein, each drilling mechanism having an electric switch operable upon retraction of the drill to start the feeding operation and an electric switch operable upon feeding of the drill through the liner to cause retraction thereof, a pneumatic connection to the drilling mechanisms including electropneumatic valves controlled by the electric switches thereon, torch pilot, preheating and cutting gas lines extending to the torches each including valve, and an electromagnetic valve in the preheating and cutting gas lines, an index counting mechanism operably connected to the indexing mechanism and operable in steps from and back to a liner loading and unloading position, said index mechanism being operably connected to said gas valves for cutting off pilot, preheating and cutting gas to the torches when the liners are indexed back to the loading and unloading position, said index counting mechanism having an electric switch controlling the electropneumatic cutting gas valve to cut off gas until the liners are moved from the loading and unloading position and an electric stop switch operable upon movement of the liners back to the loading and unloading position, a stationary template having an opening therein, a ramp movable into and out of the opening in the template, electromagnetic means for moving the ramp, an electric template tracer mechanism having a magnetic tracer roller retained in magnetic driving engagement with the wall of the template opening and ramp when in the opening, said tracer mechanism being connected to the torches to cause them to follow movement of the tracer mechanism, said template having electric detent check, ramp control, gas turn on, index control and gas turn off switches operable by contact of the tracer roller, said ramp having electric time delay, tracer mechanism control and a gas turn on switch also operable by the tracer roller, and electrical power and control connections including a manual start, time delay, holding, and sequence relays connected to the above-mentioned switches and electropneumatic and electromagnetic means to cause drilling of the holes in the liners, indexing of the liners, cutting of ports in the liners from the holes drilled and shut off of the electric means and gas valves upon movement of the liners back to the loading and unloading position.

9. In an automatic port forming machine for engine cylinders, an angularly movable, cylinder supporting chuck, means for indexing the chuck in angular steps, a drilling mechanism adjacent the chuck for drilling holes in the cylinder, indexing mechanism for the indexing means, operable in response to completion of the drilling operation by the drilling mechanism, a gas cutting torch movable in a plane spaced angularly from the drilling mechanism for cutting ports in the cylinder from a hole drilled therein, a gas control mechanism for the cutting torch, a template having an opening therein, a ramp movable into and out of the template opening, ramp moving mechanism, a template and ramp tracer mechanism operatively connected to the torch and adapted to follow the surface of the template opening and template and ramp when moved into said opening, and control connectors including manually operable starting control means, stopping control means operable by the indexing means upon a preselected number of angular indexing steps, control devices on said template and template ramp operated by the tracer mechanism and time, sequence and holding control means connected to and operable in response to operation of said control devices and said stopping control means to control intermittent, sequential and simultaneous operation of said drilling mechanism and said cutting torch to form a row of circumferential ports in the cylinder and to stop operation of the tracer mechanism by said stopping control means.

10. In a cylinder port forming machine, an angularly movable cylinder chuck for supporting a cylinder having a row of circumferentially spaced holes, a gas cutting torch adjacent the chuck and movable in a plane normal to the axis of each hole in the cylinder to flame cut a port therein starting from a hole therein, a stationary template having an opening therein, a template ramp movable into and out of the template opening, tracer means operatively connected to the cutting torch and movable in a closed path along the ramp and around a portion of the template opening to position the torch in alignment with a hole in the cylinder and also movable around the template opening to form a cylinder port by the torch starting from a hole in the cylinder, indexing means for the chuck to position each of the cylinder holes to start a separate port cutting operation by the torch, manual means to control operation of the tracer mechanism, gas control means for the cutting torch operable by the indexing mechanism to cut off the gas supply to the torch in a starting and a final indexing position of the chuck, separate control means on said template and template ramp operable by the tracer mechanism and connected to the tracer, gas control and indexing means and to the manual control means and gas control means operable by the indexing means to successively preheat the cylinder adjacent each hole therein, to flame cut a port starting from each cylinder hole upon successive indexing of the chuck and to stop the tracer means and to cut off the cutting gas to the torch at the final indexing position of the cylinder chuck.

11. In a cylinder port forming machine, a frame including a coolant tank, a cylinder chuck rotatable in the frame to support a cylinder having a row of circumferentially spaced holes therein for partial immersion in the coolant tank, a gas cutting torch supported on the frame for movement in a plane normal to a hole in the cylinder above the coolant tank, indexing means to index the chuck and cylinder supported therein one hole at a time, a template on the frame having an opening therein, a template ramp movable on the frame into and out of the template opening, means for moving the ramp, template and template ramp tracer means to move the cutting torch in a closed path normal to each hole in the cylinder upon indexing thereof by the indexing means, manual control means to control operation of the tracer mechanism, gas control means operable by the indexing means to cut off gas from the torch and to stop the tracer means in a starting and final indexing position, a second control means operable by the indexing means upon completion of each indexing operation thereof, separate control means spaced around the template opening and along the template ramp operable by the tracer means and connected to the indexing, ramp moving, and gas control means and to the manual means and the first and second control means operable by the indexing means to preheat the cylinder adjacent each hole therein, to cut a port in the cylinder starting from said hole upon successive indexing of the chuck and to cut off gas to the torch and stop the tracer mechanism at the final indexing position of the chuck and to also stop the tracer mechanism if any indexing step is not completed.

12. In an automatic port forming machine for engine cylinders, angularly movable cylinder chucks, a coolant tank adjacent the chucks for partial immersion in the coolant of the cylinders in the coolant tank, a drilling mechanism adjacent each chuck to drill separate holes in the cylinders, movable cutting torches spaced from the drilling mechanisms and coolant tank for preheating the cylinders adjacent the holes drilled by the drilling mechanisms and to cut ports in the cylinders starting from the drilled holes in the cylinders, pilot, preheating and cutting gas controlling devices for the torches, chuck indexing mechanism for indexing the chucks angularly in steps from between starting to a finished indexing position for drilling holes in the cylinders in the starting indexing position, for forming ports by the torches in the finished indexing position and for simultaneously drilling holes and forming ports in the cylinders for all other intermediate indexing positions, a template having an opening therein, a template ramp, ramp operating mechanism for moving the ramp into and out of the template opening, a tracer mechanism movable along the ramp and around the template opening and operably connected to the torches for positioning the torches over any previously drilled holes in the cylinder while other holes are being drilled in the cylinders after indexing and movable around the template opening only after these other holes are drilled to cut ports in the cylinders by means of the torches from the previously drilled holes, said template and said ramp having control means thereon operable by the tracer mechanism for controlling operation of the tracer, indexing and drilling mechanisms and for also controlling the preheating and cutting gas controlling devices for the torches, manually operable means to control starting of the tracer mechanism and to control the pilot gas controlling means for the torches, indexing counting control means operable by the indexing control means and interconnected with the gas control means and tracer control mechanism to shut off the gas supply to the torches and stop operation of the tracer motor in the finished indexing position.

LEO L. YOUNG.
ALBERT C. DRECHSLER.
BRONISLAW T. BRZOZOWSKI.

REFERENCES CITED

The following references are of record in the file of this patent:

UNITED STATES PATENTS

| Number | Name | Date |
|---|---|---|
| 1,365,021 | Bucknam | Jan. 11, 1921 |
| 1,585,893 | Coberly | May 25, 1926 |
| 1,977,710 | Anderson | Oct. 23, 1934 |